United States Patent [19]
Kytta

[11] Patent Number: 4,771,605
[45] Date of Patent: Sep. 20, 1988

[54] REINFORCED MASTER CYLINDER WITH INTEGRALLY MOLDED CYLINDER LINER AND RESERVOIR

[75] Inventor: Oswald O. Kytta, South Bend, Ind.

[73] Assignee: Allied Corporation, Morristown, N.J.

[21] Appl. No.: 325,165

[22] Filed: Dec. 27, 1981

[51] Int. Cl.⁴ ............... B60T 11/20; B60T 11/28; F01B 11/02
[52] U.S. Cl. ............... 60/562; 60/589; 92/169.4; 92/170
[58] Field of Search ............... 60/585, 586, 587, 588, 60/589, 562; 92/170, 171, 169.2, 169.4; 264/267, 268, 269, 271.1, 279, 328.1; 249/172, 175

[56] References Cited

U.S. PATENT DOCUMENTS

| | | | |
|---|---|---|---|
| 3,156,097 | 11/1964 | Brown | 60/588 |
| 4,162,616 | 7/1979 | Hayashida | 92/171 X |
| 4,249,381 | 2/1981 | Gaiser | 60/589 X |
| 4,363,387 | 12/1982 | Roberts | 92/170 X |

FOREIGN PATENT DOCUMENTS

| | | | |
|---|---|---|---|
| 1729137 | 11/1970 | Fed. Rep. of Germany | 264/269 |
| 2926008 | 10/1980 | Fed. Rep. of Germany | 264/279 |
| 53-38866 | 4/1978 | Japan | 60/588 |
| 1481612 | 8/1977 | United Kingdom | 92/171 |
| 2076095A | 11/1981 | United Kingdom | 92/171 |

Primary Examiner—Robert E. Garrett
Assistant Examiner—George Kapsalas
Attorney, Agent, or Firm—Ken C. Decker

[57] ABSTRACT

A master cylinder assembly (10) and method for manufacturing the same includes a housing 12 for movably receiving a pair of pistons (32, 34) which cooperate with seals (28, 30) to communicate fluid pressure to respective brake circuits during braking. A reservoir 40 is formed by an integrally molded single unit which also extends into the housing bore (11) to define a liner (46) which substantially positions the seals (28, 30) within the bore (11). A sleeve (26) is also positioned in the bore 11 by the liner (46). When the master cylinder assembly (10) is manufactured the reservoir (40) and liner (46) are formed simultaneously.

5 Claims, 1 Drawing Sheet

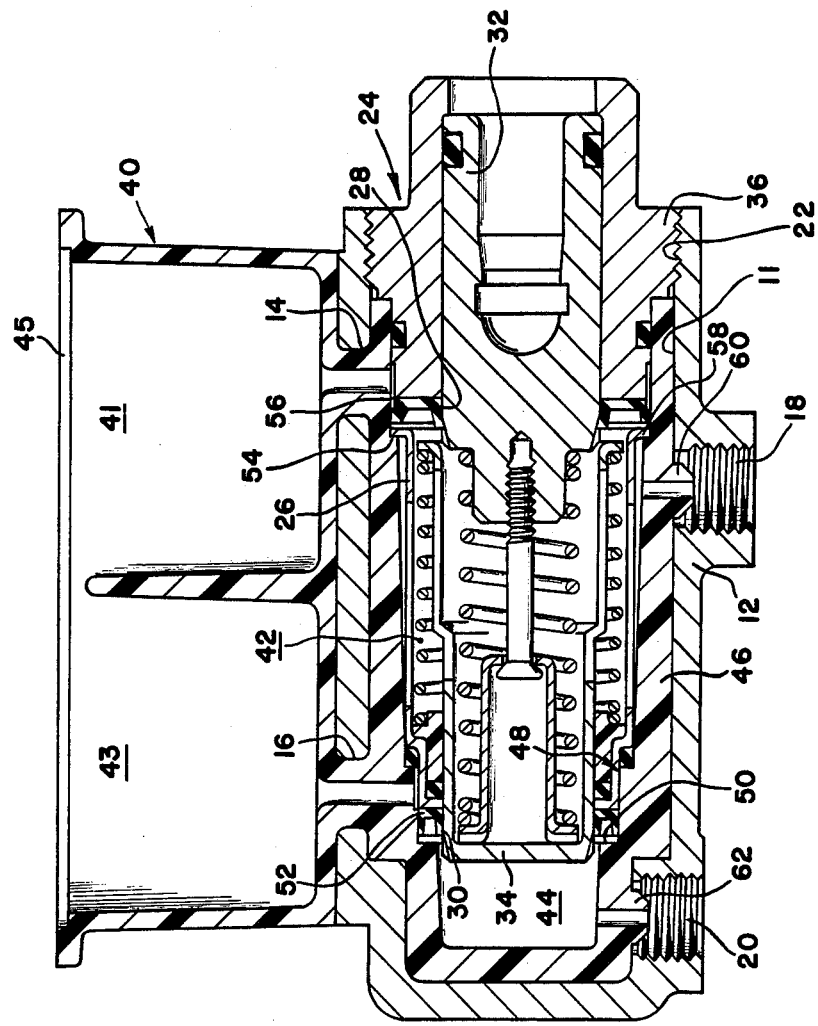

REINFORCED MASTER CYLINDER WITH INTEGRALLY MOLDED CYLINDER LINER AND RESERVOIR

BACKGROUND OF THE INVENTION

This invention relates to a master cylinder and method for manufacturing the same.

A master cylinder assembly includes a housing defining a bore (11) for movably receiving a pair of pistons (32, 34) a pair of sealing members (28, 30) cooperating with the pair of pistons (32, 34) to substantially define a pair of pressure chambers (42, 44), a sleeve (26) disposed within the housing bore to define substantially fixed positions for the pair of sealing members and a reservoir (40) coupled to the housing, the reservoir communicating with the housing bore to permit fluid carried within the reservoir to communicate with the housing bore, and the pair of pistons being movable during braking to generate fluid pressure within the pair of pressure chambers.

In U.S. Pat. No. 4,249,381, a sleeve is disposed within a master cylinder housing to define positions for fixedly locating a pair of sealing assemblies. In order to accurately locate the sleeve within the housing, it is necessary to machine a housing bore after the housing is formed by die casting or other suitable operations. Also, a reservoir is integrally defined by the housing and if the housing is made from a metal the reservoir will add more weight than if the reservoir is defined by a lightweight plastic material.

The machining operation increases the cost of the master cylinder assembly and also increases the time required to manufacture the master cylinder assembly. Also, the integrally formed metal reservoir increases the weight of the master cylinder housing.

SUMMARY OF THE INVENTION

The master cylinder assembly and method for manufacturing the same provides a solution for the above problems. The invention is characterized by the reservoir (40) comprising an integrally molded single unit (40, 46) which extends into the housing bore to cooperate with said sleeve (26) in order to define a fixed position therefore.

It is an advantage of the present invention that the time and cost for manufacturing a master cylinder assembly are believed to be reduced.

BRIEF DESCRIPTION OF THE DRAWING

The invention will now be described with reference to the accompanying drawing which shows a cross section of a master cylinder assembly assembly constructed in accordance with the present invention.

DESCRIPTION OF THE PREFERRED EMBODIMENT

The master cylinder assembly 10 includes a housing 12 with a bore 11 and a first pair of openings 14 and 16 and a second pair of openings 18 and 20. The bore 11 leads to an opening 22 which receives a cartridge assembly 24. The cartridge assembly includes a sleeve 26 fixedly positioning a pair of sealing assemblies 28 and 30 within the bore 11, a first piston 32, commonly referred to as the primary piston, a second piston 34, commonly referred to as the secondary piston and a bearing 36 coupled to the housing 12. Coil springs are provided to bias the pistons 32 and 34 to a rest position wherein fluid paths communicate a fluid carrying reservoir 40 with a first pressure chamber 42 via opening 14 and also with a second pressure chamber 44 via opening 16. The reservoir 40 and cavities 41 and 43 are closed by means of a cover 45.

In accordance with the present invention, the reservoir 40 is formed by an integrally molded single unit which also extends into the bore 11 via openings 14 and 16 to define a liner 46. The liner 46 engages the wall of bore 11 and defines a stepped bore 48. The stepped bore 48 forms a shoulder 50 opposing the end of sleeve 26 to define a space 52 receiving the sealing ring 30. Another shoulder 54 on the stepped bore 48 opposes the bearing 36 to define a space 56 for receiving the sealing ring 28. The space 56 also receives a flange 58 at the end of sleeve 26 so that the liner defines a fixed position for the sleeve 26 within the bore 11.

The liner 46 includes radially extending bosses 60 and 62 which extend into the openings 18 and 20, respectively. The bosses 60 and 62 are spaced from the wall of openings 18 and 20 to permit fittings with seals (not shown) to tightly engage the housing and the bosses.

In order to manufacture the master cylinder assembly 10, the housing 12 is fitted over a mandril so that the latter is disposed within the bore 11 in spaced relation thereto. A suitable die is provided for the cavities of the reservoir 40 and the fluid passages within openings 14 and 16. A suitable plug is inserted into the openings 18 and 20 to form the bosses and the fluid paths. Next, a plastic such as NYLON is injection molded into the space between the bore 11 and the mandril as well as simultaneously into the dies defining the reservoir 40 and the bosses 60 and 62. When the plastic is hardened, the plug dies and mandril are removed and the housing 12 with its attached integrally molded reservoir and liner is ready to receive the cartridge assembly 24 and the cover 45.

In an alternative embodiment (not shown) it is possible to integrally connect the liner 46 and the reservoir 40 via a separate opening on the housing 12 apart from openings 14 and 16.

I claim:

1. A master cylinder assembly having a housing defining a bore for movably receiving a pair of pistons, a pair of sealing members cooperating with the pair of pistons to substantially define a pair of pressure chambers, a sleeve disposed within the housing bore to define substantially fixed positions for the pair of sealing members and a reservoir coupled to the housing, the reservoir communicating with the housing bore to permit fluid carried within the reservoir to communicate with the housing bore, and the pair of pistons being movable during braking to generate fluid pressure within the pair of pressure chambers; characterized by said reservoir comprising an integrally molded single unit of different material than said housing said integrally molded single unit extends into the housing bore to cooperate with said sleeve in order to define a fixed position therefore, said integrally molded single unit isolates the fluid disposed within said reservoir and within said pair of pressure chambers from the housing, said integrally molded single unit defines a pair of passages extending from the reservoir to the housing bore and said integrally molded single unit isolates said pair of passages from the housing.

2. The master cylinder assembly of claim 1 in which said housing defines a first pair of openings and a second pair of openings, said integrally molded single unit extending completely through said first pair of openings to define fluid paths leading from the reservoir to the housing bore and said integrally molded single unit extending partially into said second pair of openings to define fluid paths communicating with a pair of brake circuits, respectively.

3. A master cylinder comprising a housing with a bore movably receiving a pair of pistons, a reservoir unit separate from the housing and defining at least one fluid carrying cavity, the reservoir unit including an integrally formed portion extending into the housing bore and cooperating with the pair of pistons to substantially define boundaries for a pair of pressure chambers normally communicating with the one fluid carrying cavity in a rest position, the pair of pistons are movable during a braking application to close communication between the pair of pressure chambers and the fluid carrying cavity in order to develop fluid pressure in the pair of pressure chambers so that the fluid pressure in the pair of pressure chambers biases the integrally formed portion outwardly against the housing, and the integrally formed portion cooperates with the reservoir unit to permanently attach with the housing.

4. The master cylinder of claim 3 in which the housing includes at least one opening and the reservoir unit extends through the one opening to connect with the integrally formed portion and also to define a passage communicating the one fluid carrying cavity with one of the pair of pressure chambers.

5. The master cylinder of claim 3 in which the reservoir unit and integrally formed portion are simultaneous coupled to the housing so that the integrally formed portion extends substantially over the length of the housing bore and the reservoir unit is disposed outside the housing to isolate all of the housing from any of the fluid.

* * * * *